Patented Sept. 9, 1952

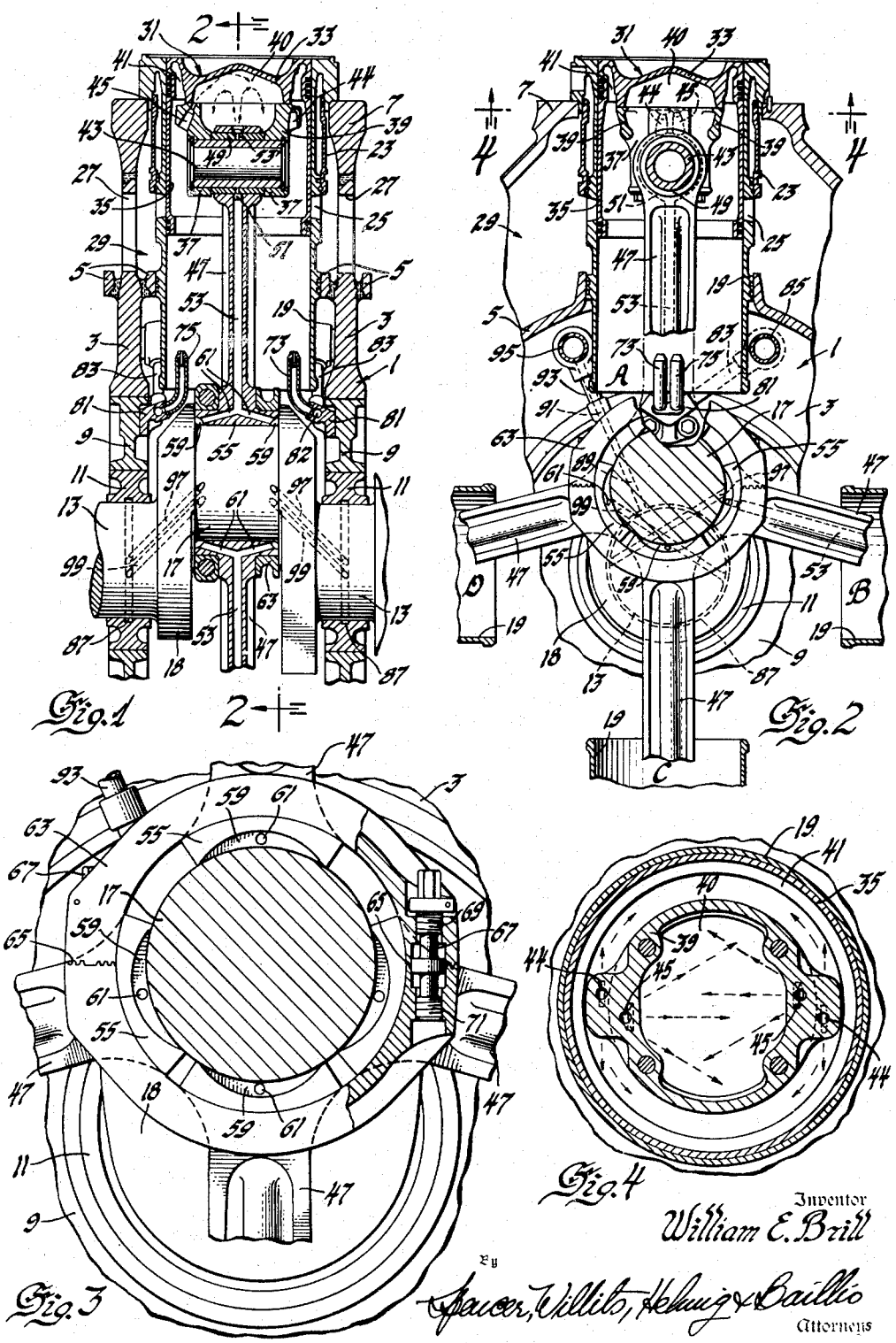

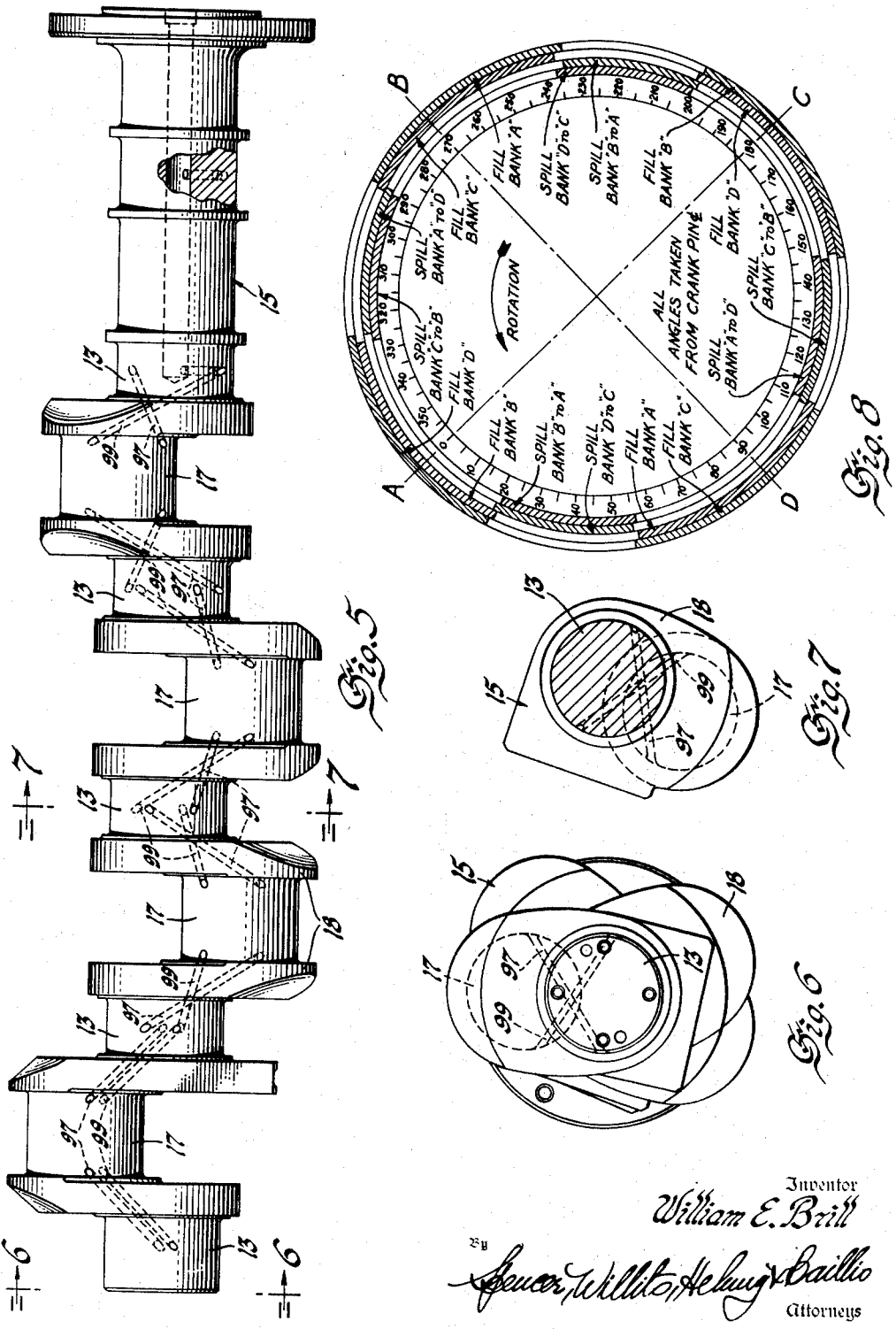

2,609,799

UNITED STATES PATENT OFFICE 2,609,799

ENGINE COOLING AND LUBRICATING SYSTEM

William E. Brill, Cleveland, Ohio, assignor to General Motors Corporation, Detroit, Mich., a corporation of Delaware Application February 10, 1949, Serial No. 75,586

9 Claims. (Cl. 123—41.38)

1

The present invention generally relates to improvements in internal combustion engines and more particularly to means for lubricating and cooling radially disposed reciprocating and rotating parts of a radial engine.

The principal object of the present invention is to provide oil passages in the crankshaft, crankpins and the connecting rods having slipper type bearings of segmental form bearing at different points on each crankpin for lubricating the piston pins and cooling the pistons having oil directing means and oil jets impinging thereon to insure adequate cooling of the pistons and adequate lubrication of the bearings of a lightweight two-cycle compression ignition engine of the multi-row radial type adapted to operate continuously at high speeds and loads.

The combined means and arrangement thereof by which the above object is accomplished together with other novel features of the invention will become apparent by reference to the following detailed description and accompanying drawings clearly disclosing these means and the arrangement thereof.

Figure 1 of the drawings is a longitudinal sectional view of the engine with parts shown broken away and in section.

Figure 2 is a transverse sectional view taken on line 2—2 of Figure 1 with parts shown broken away and in section.

Figure 3 is an enlarged view of a portion of Figure 2 with parts shown broken away and in section.

Figure 4 is an enlarged sectional view of an engine piston taken on line 4—4 of Figure 2.

Figure 5 is a longitudinal elevation view of the engine crankshaft with parts shown broken away and in section.

Figure 6 is an end elevation view taken on line 6—6 of Figure 5.

Figure 7 is a transverse sectional view taken on line 7—7 of Figure 5.

Figure 8 is a chart showing the sequence of events occurring in the lubrication and cooling cycle of the engine.

The engine illustrated in the various figures of the drawings is a lightweight two-cycle, compression ignition engine of the multi-row radial type. The engine comprises a fabricated frame, generally indicated by the character reference 1, and comprising longitudinally spaced transverse web or stress members 3 and concentrically arranged inner and outer cylinder liner deck members 5—7 secured at the ends to adjacent stress members 3.

The stress members 3 are provided with longitudinally aligned main bearing openings in which are movably secured main bearing adapters 9 and main bearings 11 rotatably supporting the five main journals 13 of a crankshaft, generally indicated by the character reference 15 in Figure 5, thereby to position each of the four crankpins 17 and crank arms 18 of the shaft between adjacent stress members 3.

The cylinder liner deck members 5—7 are provided with radially aligned openings in which one row of four cylinder liners 19 are supported 90° apart, the liners in each radial row forming four longitudinally aligned cylinder banks A—B—C—D of four cylinders each. Each liner is provided with a coolant jacket 23 and a circumferential row of air inlet scavenging and charging ports 25 opening into the space between the inner and outer deck members 5—7 and between adjacent stress members 3, the intermediate stress members 3 having openings 27 therein also located between the deck members to provide a common air chamber, generally indicated by the character reference 29 for the air inlet ports 25 of all the engine cylinder liners 19.

Each of the engine pistons, generally indicated by the character reference 31, is slidable in a cylinder liner 19 past the air inlet ports 25 therein. Each piston has a head portion 33, a skirt portion 35 and longitudinally spaced piston pin carrier portions 37 extending inwardly from the head portion. The upper extremities of these carrier portions 37 and the head portion 33 are connected by arcuate webs 39 to form a central inverted dome shaped piston cavity 40 and an annular groove 41 concentric therewith adjacent the piston head portion 33. The piston carrier portions 37 are provided with longitudinally aligned holes in which the end portions of a piston pin 43 are rotatably carried and two pairs of oil directing passages 44—45 to be subsequently described are provided in the pin carrier portions 37 radially outwardly from the ends of the pin. Suitable piston pin retaining means are shown adjacent the ends of the piston pin 43 in the openings in the piston carrier portions 37 to prevent outward movement of the pin.

The outer end of a connecting rod 47 is shown provided with an opening in which a piston pin bushing 49 is secured. The intermediate portion of the piston pin 43 is rotatable in the bushing 49. An internal groove 51 is provided in the central portion of the opening in the connecting rod surrounding the piston pin bushing 49. Diametral holes 53' in the bushing lead from the rod groove 51 to the piston pin 43 and an axial oil hole 53' extends from the outer end of the connecting rod 47 into the groove 51 around the piston pin bushing 49 and terminates adjacent a slipper bearing portion 55 of the connecting rod of segmental form adapted to bear on an arcuate portion of a crankshaft crankpin 17 of the fillet portions at the ends thereof. The end faces of slipper bearing portions 55 of the connecting rods bear on the radial faces of the crank cheeks and are provided with arcuate grooves 59 adjacent the fillet portions of the crankpin 17 and oil holes 61 extend from each of the grooves 59 to the bottom of the axial oil hole 53' in the connecting rod 47, as best illustrated in Figure 1.

The slipper bearing portions 55 of four connecting rods 47 for the four pistons 31 in each radial row of cylinder liners 19 are retained in bearing relation on each crankpin 17 of the crankshaft by means of a pair of split retaining rings 63 encircling and bearing on the outer arcuate surfaces of the slipper bearing portions 55 between the shank portion of the connecting rod and the radial surfaces of the adjacent crank cheeks. As best illustrated in Figure 3 the diametral abutting end faces of the two parts of each split ring 63 are provided with transverse interengaging teeth 65 and studs 67 having right and left-hand threaded portions 67—71 engaging similar threaded portions of the split ring to retain these teeth in engagement and the internal surface of the split ring in bearing engagement with the external arcuate surfaces of the slipper bearing portions of four connecting rods and thereby retain the internal arcuate bearing surface in bearing contact with peripheral portions and the fillet portions of a crankpin at high engine speeds.

In order to supply oil to the piston cavities 40—41 through the previously mentioned oil directing passages 44—45 therein and also through connecting rod passages 53—61 which also supplies oil to the piston pin two pairs of nozzles 73—75 are secured to adjacent main bearing adapters 9 for each piston to direct oil to the oil directing passages and two pairs of oil passages 97—99 are provided between each crankpin 17 of the crankshaft and adjacent main journals thereof. Each pair of nozzles 73—75 is secured to a bracket 81 having a nozzle supply passage 82 connected by means of a tube 83 to certain oil pressure manifolds 85 extending longitudinally between the cylinder liner banks. Each main bearing 11 is provided with a centrally located internal groove 87 and passages 89—91 communicating therewith in each main bearing 11 and each main bearing adapter 9 is connected by means of a tube 93 with certain other oil pressure manifolds 95 also extending longitudinally between the cylinder banks. The oil pressure manifolds 85—95 are supplied with oil under pressure by engine driven oil pumps, not shown.

Each pair of nozzles 73—75 are arranged to direct parallel jets of oil radially outwardly into each pair of oil directing passages 44—45 having circular converging oil inlet orifices and narrow rectangular oil discharge orifices having diverging narrow side walls, as best shown in Figures 1, 2 and 4 of the drawings. As best shown in Figure 4 the inlet orifices of each pair of oil directing passages are located radially outwardly from each end of the piston pin 43 and on opposite sides of the center line of the pin. The separate passages 44 and 45 of each pair are positioned diagonally with respect to the ends of the pin. The axes of the separate passages 44 are transversely inclined in opposite directions toward the longitudinal center plane of the annular piston groove 41 so that two narrow diverging jets of oil are directed from the outlet orifices onto the walls of the piston groove 41 and are deflected in opposite directions around the walls, the two deflected oil jets meeting along the transverse center plane of the piston groove. The axes of the passages 45 are inclined longitudinally so that two narrow diverging jets of oil are directed longitudinally in opposite directions onto the inner wall of the piston head within the central piston cavity 40 and the two jets being deflected therefrom and also meet along the transverse center plane of this cavity. Oil is also directed alternately either side of the longitudinal center plane of the central piston cavity 40 along the transverse center line of the inner surface of the piston head portion from the longitudinal hole 53 of the connecting rod 47 by oscillation of the connecting rod. Oil pressure is supplied to this hole 53 from the branch holes 61 leading to each of the grooves 59 in each end face of slipper bearing portions 55 of the rod 47 adjacent the fillet portions of the crankpin 17. Two pairs of oil holes 97—99 are drilled angularly from substantially opposite points in each end fillet portion of each crankpin 17 from either side of the longitudinal midplane of the crank arms to substantially diametrically opposite points in each adjacent main journal intermediate the ends thereof for registry with the oil pressure supply grooves 87 in the main bearings 13. The arcuate grooves 59 in the ends of the connecting rod slipper bearing portions 55 are of sufficient arcuate length for intermittent simultaneous registration with separate oil holes of each pair of holes 97—99 between the respective crankpins and adjacent main crankshaft journals so that the connecting rod oil holes 53—61 of each of the cylinder banks A—B—C—D are filled with oil pressure twice each revolution of the crankshaft, the oil pressure spilling from each of the crankshaft holes 97—99 four times each crankshaft revolution when rotating between the slipper bearings of the rods of each cylinder bank as best indicated in the chart Figure 8.

As best seen in Figure 2, when the crankpin 17 is on upper dead center, with reference to the cylinder liner bank A, corresponding to zero crankshaft degrees in Figure 8 and moving counterclockwise in the direction of the arrow, the two crankshaft oil holes 99 of each pair of holes register with the arcuate grooves 59 and passages 53—61 in the connecting rods 47 of the pistons 31 in cylinder liner bank D and the other two crankshaft oil holes 97 of each pair register with the grooves 59 and passages 53—61 in the connecting rods 47 of the pistons 31 in cylinder liner bank B. Twenty degrees later the crankpin 17 is 20° past upper dead center with relation to cylinder bank A and 70° ahead of upper dead center with relation to cylinder bank D and the crankshaft oil holes 99 move out of register with the oil grooves 59 of the connecting rod 47 of cylinder bank D and oil pressure spills from the holes 99 into the internal surfaces of the connecting rod retaining rings 63. Two degrees later the crankshaft oil holes 97 move out of register with the grooves 61 in the connecting rod 47 of bank B. The crankpin 17 is now at a position 22° after upper dead center with respect to cylinder bank A, 68° ahead of upper dead center with respect to cylinder bank D and 112° after upper dead center with respect to cylinder bank B. Oil pressure continues to spill from both pairs of crankshaft oil holes 97—99 for approximately 35° until the oil holes 99 register with the grooves 59 in the connecting rod of cylinder bank C and oil pressure fills these grooves and the passages 53—61 of this rod. The crankpin 17 is now 35° ahead of upper dead center with reference to cylinder bank D and oil pressure spill from the oil holes 97 continues 2° more until the holes 97 register with the grooves 59 of the connecting rod of bank A to fill the passages 53—61 therein. The crankpin 17 is now at a position 56° after upper dead center with reference to cylinder bank A and 69° ahead of lower dead center. It will be noted from the chart Figure 8 that oil pressure filling of the grooves 59 and passages 53—61 of the connecting rod of each cylinder bank starts approximately 55° after upper dead center and continues for approximately 55° until the rod is approximately 110° past upper dead center, and oil pressure filling again occurs at approximately 55° after low dead center and continues approximately 55° and ends approximately 70° before upper dead center. Oil pressure spilling from both pairs of crankshaft oil holes onto the connecting rod retaining rings occurring for approximately 35° of crank angle between oil pressure filling of the connecting rods of adjacent cylinder banks.

It will be evident from Figure 8 that the crankshaft oil holes register with the rod grooves and passages of each connecting rod twice each revolution of the crankpin for an interval of approximately 55 crankshaft degrees ending approximately 70° before upper and lower dead center positions and during mid power and charging strokes of the pistons. The oil filling the crankshaft and connecting rod passages at these times will be sprayed from the longitudinal oil holes 53 in the connecting rod at high pressure onto the inner surface of the piston head forming the central piston cavity 40 either side of the longitudinal axis of the piston at an angle as the connecting rod is then inclined oppositely with respect to the longitudinal center line of the piston. Oil pressure in the connecting rod passages is applied also to the piston pin through the oil holes 53' in the piston pin bushing 49. The scrubbing action of this intermittent oil spray from the rod passages into the piston together with the continuous longitudinal and circumferential scrubbing action of the diverging oil jets directed by oil directing passages 44—45 in the piston from the stationary nozzles 73—75 provides efficient cooling of the engine pistons at high speeds and loads. This oil from the pistons and the oil spray from the crankshaft holes 97—99 onto the connecting rod retaining rings falls directly on the portions of crankpin surfaces between the slipper bearing portions 55 of the rod for adequate lubrication of the crankpins. By providing the arcuate oil entrance grooves in the lightly loaded end faces rather than in the heavily loaded arcuate faces of connecting rod slipper bearing portions bearing on the peripheral portions of the crankpin and by providing the above described means for adequately lubricating these bearings no oil grooves need be provided therein and greater bearing area is accordingly obtained to withstand these high loads.

I claim:

1. In an internal combustion engine lubricating and cooling system, an engine frame including a cylinder, nozzles on said frame for directing lubricating and cooling fluid into the cylinder, a piston having a skirt slidable in the cylinder and a head having an inward extension forming a central head cavity and surrounding groove and having fluid directing passages supplied with fluid from the nozzles for directing fluid into the head cavity and surrounding groove.

2. In an internal combustion engine and cooling system, an engine frame including aligned main bearings and a cylinder disposed radially therebetween, a crankshaft having main journals supported in the main bearings and crank arms and a crankpin therebetween, said crankshaft having lubricating and cooling fluid pressure supply passages extending from each main bearing to the adjacent end of the crankpin, a piston having a skirt slidable in the cylinder, a head portion and a piston pin carrier portion, a piston pin supported in the piston pin carrier portion, a connecting rod having a crankpin bearing portion engageable with the crankpin and having grooves in the ends registering intermittently with the crankshaft fluid supply passages and passages in the rod leading from the rod grooves to the opposite end of the rod pivotally connected to the piston pin for supplying fluid to the piston head and piston pin.

3. In an internal combustion engine lubricating and cooling system, an engine frame including a cylinder, nozzles on said frame for directing jets of lubricating and cooling oil into the cylinder, a piston having a skirt slidable in the cylinder and a head having an inwardly extending portion forming a head cavity and a surrounding groove and provided with aligned bearing openings for a piston pin and oil directing openings aligned with the oil jets from the nozzles and having narrow diverging outlets facing the wall of the piston head cavity and surrounding groove for directing narrow diverging streams of oil across the piston cavity surface and onto bottom and around the walls of the surrounding groove, the oil from the head cavity and groove lubricating the piston pin bearing openings.

4. In an internal combustion engine lubricating and cooling system, an engine frame including longitudinally aligned main bearings, cylinders disposed radially therebetween and nozzles for directing jets of lubricating and cooling oil radially into the cylinders, a piston in each cylinder including a skirt portion and a head portion extending into the skirt portion and forming a piston pin carrier, a central head cavity and surrounding groove, a piston pin supported at the ends in the piston pin carrier portion, said carrier portion having oil directing passages adjacent the ends of the piston pin including inlet openings aligned with the oil jets from the nozzles and narrow diverging outlets for directing oil in narrow diverging oil streams across the wall of the central piston head cavity in opposite directions toward the transverse center line thereof and for directing narrow diverging oil streams onto the bottom of the groove at substantially diametrically opposite points for movement in opposite directions around the groove walls toward the transverse center line of the piston, the oil from the cavity and groove lubricating the piston pin and carrier portion of the piston.

5. In an internal combustion engine lubricating and cooling system, an engine frame including longitudinally aligned main bearings, cylinders disposed radially therebetween and nozzles for directing jets of lubricating and cooling oil radially into the cylinders, a piston in each cylinder including a skirt portion and a head portion extending into the skirt portion and forming a piston pin carrier, a central head cavity and surrounding groove, a piston pin supported at the ends in the piston pin carrier portion, said carrier portion having oil directing passages adjacent the ends of the piston pin including converging inlet openings aligned with the oil jets from the nozzles and narrow diverging outlets for directing oil in narrow diverging oil streams across the wall of the central piston head cavity in opposite directions toward the transverse center line thereof and for directing narrow diverging oil streams onto the bottom of the groove at substantially diametrically opposite points for movement in opposite directions around the groove walls toward the transverse center line of the piston, the oil from the cavity and groove lubricating the piston pin and carrier portion of the piston.

6. In an internal combustion engine lubricating and cooling system, an engine frame including longitudinally spaced main bearings, a cylinder therebetween, and nozzles for directing jets of lubricating and cooling oil radially into the cylinder, a piston having a skirt slidable in the cylinder and a head having a portion projecting into the skirt and forming a dome shaped central cavity and a surrounding groove, said head portion having longitudinally aligned piston pin bearing openings and oil directing openings adjacent the ends of said bearing openings having converging inlet portions aligned with the lubricating and cooling oil jets from the nozzles and narrow diverging outlet portions directed toward the surfaces of the dome shaped central cavity and bottom of the annular groove at substantially diametrically opposite points.

7. In a lubricating and cooling system for an internal combustion engine, an engine frame including longitudinally aligned main bearings and cylinders disposed radially therebetween, a crankshaft having main journals supported in the main bearings, crank arms and a crankpin having fillets at the ends and a pair of lubricating oil delivery passages extending from each crankpin fillet on opposite sides of the center plane of the crank arms to a lubricating supply opening in an adjacent main journal, a plurality of connecting rods each having an inner end arcuate crankpin bearing portion in engagement with each crankpin and the end fillets thereof and provided with arcuate grooves in the end faces alternately registering with each of the lubricating oil delivery passages in the crankpin fillet portions and having passages leading from these grooves to the outer end of the rod, split retaining rings including end clamping bolts surrounding the ends of the connecting rod inner end crankpin bearing portions for retaining these portions in engagement with the crankpin, a piston in each cylinder including a piston pin carrier and a piston pin in each piston carrier pivotally connected to the outer end of the connecting rod.

8. In an internal combustion engine lubricating and cooling system, an engine frame including longitudinally aligned main bearings having circumferential oil supply grooves, a plurality of cylinders disposed radially between the bearings, a pair of nozzles adjacent the ends of each main bearing for directing oil jets into each cylinder, a crankshaft having main journals supported in the main bearings and crank arms and a crankpin between the main journals, said crankshaft having a pair of lubricating passages between each main journal and the adjacent end of a crankpin, said passages leading from points in the main journal registering with the oil supply groove in a main bearing and located on either side of the mid-plane of a crank and leading to openings in opposite sides of the end of the adjacent crankpin, a piston in each cylinder having a skirt and a dome shaped head having a projection extending into the skirt and forming a dome shaped central head cavity and a surrounding groove, said head projection having piston pin bearing openings and a pair of oil directing passages adjacent each end of the piston having inlet openings in alignment with the oil jets from said nozzles and narrow diverging outlets for directing oil across the wall of the central dome shaped piston cavity from opposite ends thereof and onto the bottom of the surrounding piston groove from opposite ends and around the groove in opposite directions, a piston pin in each of said piston bearing openings adjacent the central piston cavity, a connecting rod pivoted on each piston pin and having an arcuate slipper bearing portion engageable with a peripheral portion of a crankpin, split retaining rings having clamping bolts with opposed hand threaded portions encircling and bearing on the outer end surface of the connecting rod bearings and in the plane of the lubricating openings in the crankpin, said connecting rod bearings having arcuate grooves in the end faces registering alternately with the crankshaft lubricating passages and connecting passages leading from these grooves to the piston pin and an opening in the end of the rod adjacent the central piston head cavity for cooling the head and lubricating the piston pin.

9. In an internal combustion engine lubricating and cooling system, an engine frame including longitudinally aligned main bearings, each bearing having an oil pressure supply groove and engine cylinders disposed radially intermediate the main bearings, a crankshaft having main journals supported in the main bearings, crank arms and crankpins having fillets at the ends thereof and a pair of oil passages in each main journal communicating with the oil pressure supply groove therein and extending to the fillets of adjacent crankpins, said passages leading from points in the main journals either side of each crank arm to points in adjacent crankpin fillets on opposite sides of the crank arms, a plurality of connecting rods for each crankpin, each connecting rod having an arcuate, inner end bearing portion in engagement with a portion of a crankpin and fillets thereof and arcuate oil grooves in the ends registering with the crankshaft oil passages twice each revolution of the crankshaft, a piston pin opening adjacent the outer end of the rod and oil passages leading from each arcuate groove therein to the outer end of the rod and communicating with the piston pin opening, a piston pin rotatable in the piston pin opening of each rod and a piston slidable in each cylinder and rotatable on a piston pin and having a cavity adjacent the outer end of the oil passage in a connecting rod to receive oil under pressure therefrom to cool and lubricate the piston, cylinder, piston pin and connecting rod.

WILLIAM E. BRILL.

REFERENCES CITED

The following references are of record in the file of this patent:

UNITED STATES PATENTS

| Number | Name | Date |
|---|---|---|
| 1,628,652 | Carlson | May 17, 1927 |
| 1,910,902 | McKone | May 23, 1933 |
| 2,046,196 | Truxell | June 30, 1936 |
| 2,456,668 | Anderson | Dec. 21, 1948 |

FOREIGN PATENTS

| Number | Country | Date |
|---|---|---|
| 358,332 | Germany | Sept. 19, 1922 |
| 372,072 | Great Britain | May 5, 1932 |